E. SCHNEIDER.
DEVICE FOR THE INJECTION OF WATER AT HIGH PRESSURE INTO THE AIR REHEATERS OF TORPEDO ENGINES.
APPLICATION FILED MAR. 28, 1914.
1,144,385.
Patented June 29, 1915.
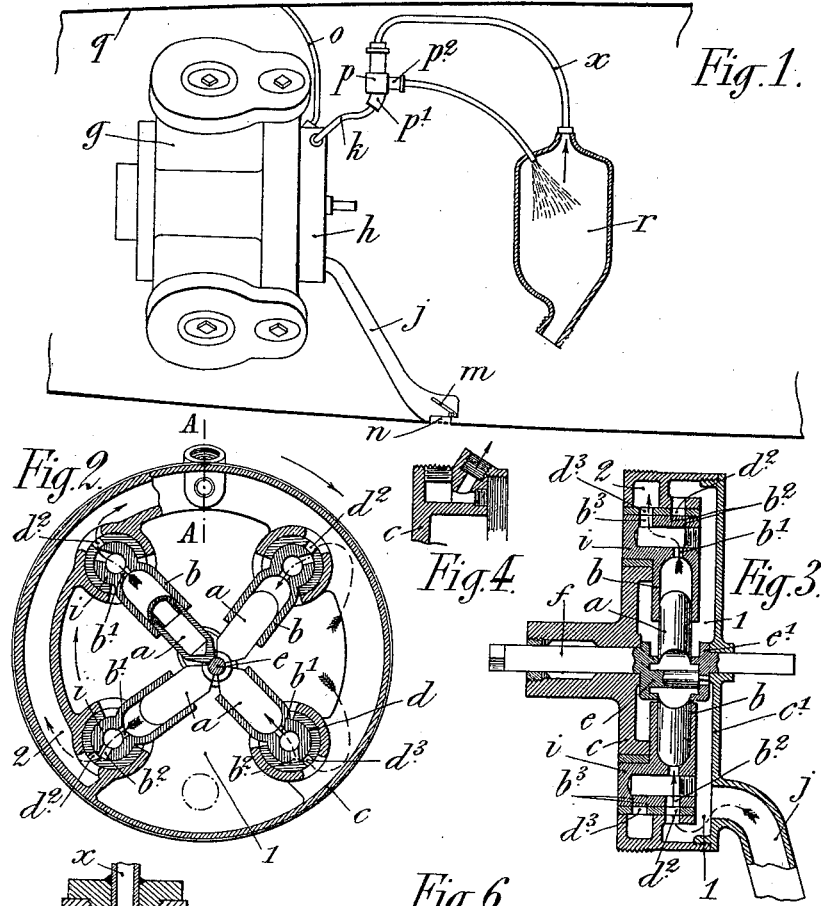
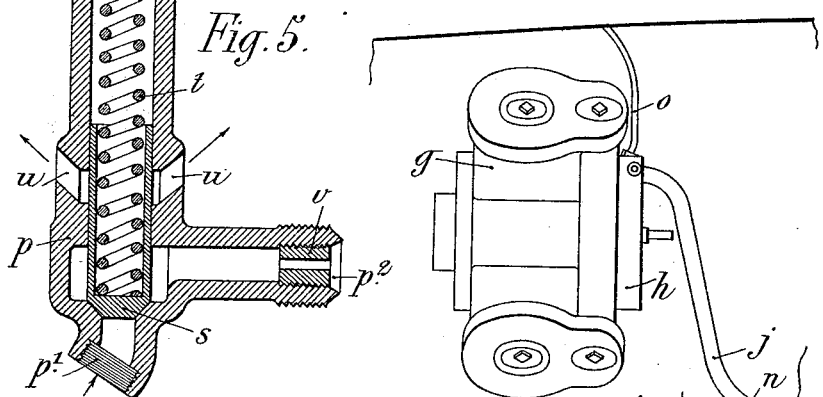

UNITED STATES PATENT OFFICE.

EUGÈNE SCHNEIDER, OF LE CREUZOT, FRANCE.

DEVICE FOR THE INJECTION OF WATER AT HIGH PRESSURE INTO THE AIR-REHEATERS OF TORPEDO-ENGINES.

1,144,385.  Specification of Letters Patent.  Patented June 29, 1915.

Application filed March 28, 1914. Serial No. 828,027.

*To all whom it may concern:*

Be it known that I, EUGÈNE SCHNEIDER, a citizen of the Republic of France, resident of Le Creuzot, Saône-et-Loire, France, have invented a new and useful Device for the Injection of Water at High Pressure Into the Air - Reheaters of Torpedo - Engines, which is fully set forth in the following specification.

It is known that the engines of torpedoes are operated by compressed air that has been previously heated in a chamber in which it is mixed with the hot gases produced by the combustion of a liquid fuel. It is also known that in order to regulate the temperature and increase the efficiency of the engine a certain quantity of fresh water obtained from an appropriate reservoir is injected into the said chamber. This water is vaporized in the chamber and the engine thus uses simultaneously compressed and heated air, hot gases from the combustion and superheated steam.

The present invention has for its object means as a whole rendering it possible to effect the injection of water in a simpler and more economical manner. In the first place these means consist in obtaining the injection water from the sea, by means of a pump fitted directly to the engine of the torpedo or in line with its shaft. This pump, which is preferably provided with the improved and exceedingly simple valve gear hereinafter described, is also, in accordance with the invention, provided with a suction pipe combined with a priming device whereby subsequent failures are avoided; this arrangement consists broadly in connecting the frame-reservoir of the pump by means of a conduit with the upper part of the hull, while the suction conduit opening at the lower part thereof is provided with a foot valve.

Finally, in accordance with the invention the pump is provided with a valve for charging and for overflow serving the double purpose of insuring on the one hand a supply of water at a constant pressure whatever the variations of pressure in the reheater may be, and also of insuring a constant given delivery according to the rate of running of the pump, by ejecting the excess of water delivered.

The various means and arrangements referred to above are represented in the accompanying drawing, in which:—

Figure 1 is a sectional elevation showing the pump installation as a whole (combined with a motor of the Brotherhood type), of the priming device and of the charging and overflow valve and their connections with the reheater. Figs. 2 and 3 illustrate the pump in longitudinal and cross section respectively. Fig. 4 is a partial section on the line A—A of Fig. 2. Fig. 5 is a detail sectional elevation of the charging and overflow valve. Fig. 6 represents a modification of the arrangement of the suction pipe of the pump relatively to the frame-reservoir of the latter.

As shown in Figs. 1 and 6, the pump whose jacket is marked $h$, can be mounted upon the engine $g$ of the torpedo in place of the front end thereof; generally speaking, the pump should be fitted in such a manner as to take its drive in line with the engine shaft.

In the example here illustrated, the multiple pump comprises four pistons $a$ and four radially arranged pump bodies $b$ identical one with the other.

The radial pump bodies $b$ open at their inner end, pivot in hooped housings in the frame $c$. With this object they are secured to or cast in one piece with a bored cylindrical end $i$, the generatrices of which are perpendicular to the axis of the pump body. In the wall of this cylinder end, and at different distances from its bottoms, two orifices $b^2$ $b^3$ are formed; these orifices are appropriately staggered relatively to each other and are so arranged as to register, alternately and respectively with two corresponding orifices $d^2$ $d^3$ formed in an interchangeable ring $d$ which is forced into the frame $c$; these orifices open respectively into the suction chamber 1 and delivery chamber 2 of the frame.

The pistons $a$ are all controlled by a crank $e$ carried by the driving shaft $f$. A counter crank $e'$ mounted upon a square extension of the crank end $e$ pivots in the cover $c'$ of the frame of the pump.

At their head the pistons carry a shoulder which enters a groove formed upon the arms of the cranks $e$ and $e'$ in such a manner that during the suction stroke they are driven by the edges of the crank shaft and counter crank.

The suction of the pistons is produced in the inner chamber 1 of the frame $c$ and the delivery into a water ring 2 cast with the said frame. The special charging and overflow valve $p$ is fixed to the delivery pipe $k$.

The pump is mounted in the torpedo in one of the manners indicated in Figs. 1 and 6.

The frame-reservoir $c$ of the pump is connected with the pipe $j$ which is inclined toward the front of the torpedo and which opens at the lower part of the hull. This pipe may present two arrangements: 1. The pipe passes to the upper part of the frame (Fig. 6). 2. The pipe passes to the lower part; it is provided in this case with a foot valve $m$ (Fig. 1) which permits of retaining the priming water supplied through the pipe $o$. In either case the pipe $j$ is provided with a sieve $n$. The pipe $o$, whose diameter is smaller than that of the preceding pipe and which is inclined rearward, connects the frame-reservoir $c$ with the upper part of the hull $q$. These arrangements as a whole have for their object to insure the constant and perfect filling of the suction frame-reservoir under a slight pressure resulting from the sea-way due to the progress of the torpedo in the water and also to insure the automatic expulsion, at the upper part, of the air that might be contained in this reservoir or which might be introduced therein with the water. It also renders it possible to fire torpedoes from the spoon tube without inconvenience. In this case before introducing the torpedo into the tube, the frame-reservoir $c$, the capacity of which has been calculated with this object in view, is filled with water from the tube $o$. While the engine of the torpedo rotates slowly in the air the pump delivers to the reheater the water contained in the frame-reservoir and it then runs normally in drawing water from the sea when the motor is running at full speed, the torpedo being in the water.

The charging and overflow valve $p$ located upon the delivery pipe $k$ serves a double purpose: 1. The delivery from the pump to the reheater $r$ is produced at a pressure which is constant and independent of the normal pressure in the said reheater. 2. When once the delivery has been regulated for each rate of running of the pump, by means of a diaphragm $v$ interposed upon the path of the delivery pipe or where this pipe enters the reheater, constancy is insured if necessary by expelling into the sea the excess volume delivered by the pump.

The valve comprises: a valve body $p$, the valve proper $s$ with cylindrical guidance, and a spring $t$ appropriately weighted.

The water enters at $p'$ and leaves at $p^2$; at $v$, for example, the diaphragm regulating the delivery is arranged.

The upper part of the valve body is connected with the reheater $r$ by a pipe $x$, the interior of the valve body being thus in equilibrium of pressure with the reheater.

The operation is as follows: As soon as the pump has been started, the water delivered by the pistons $a$ lifts the valve $s$, when the pressure is equal to the normal pressure in the reheater $r$ plus the pressure corresponding to the load upon the spring $t$. It follows that whatever this normal pressure may be the flow of water into the reheater takes place under a constant difference of pressure corresponding to the load upon the spring. Furthermore, if the volume delivered by the pump is greater than that passing through the aperture of the diaphragm $v$ for regulating the delivery, or if, accidentally, the torpedo should rise to the surface and its engine consequently race, as the delivery pressure increases in the valve body the latter will lift in compressing the spring $t$ and will uncover the overflow orifices $u$ formed in the body $p$, to the extent necessary for the discharge into the sea of the excess of water delivered by the pump, thus avoiding fracture of the apparatus or the flooding of the reheater.

What I claim and desire to secure by Letters Patent of the United States is:—

1. A device for the injection of water under pressure into air reheaters of torpedo engines, consisting of a pump driven by the engine and having a suction chamber and a delivery chamber, a water supply conduit opening toward the front part of the torpedo hull and delivering into said suction chamber, a reheater having a conduit connection with said delivery chamber, and a valve in said conduit controlled by pressure in said reheater.

2. In a device for the injection of water under pressure into air reheaters of torpedo engines, the combination of a pump driven by the engine and having a suction chamber provided with a combined priming and air exhausting conduit, said conduit adapted to open through the torpedo hull with air inclination toward the rear thereof, and a valve controlled suction pipe opening toward the front of said hull and connected to said suction chamber.

3. In a device for the injection of water under pressure into air reheaters of torpedo engines, the combination of a pump driven by the engine and having a suction chamber provided with a combined priming and air exhausting conduit, said conduit adapted to open through the torpedo hull with air inclination toward the rear thereof, a valve controlled suction pipe opening toward the front of said hull and connected to said suction chamber, a reheater having a conduit connection with said delivery chamber, and a valve in said conduit controlled by pressure in said reheater.

4. In a device of the character described, the combination of a pump, an air reheater having a valve controlled connection with the delivery chamber of said pump, said valve comprising a casing provided with inlet and outlet orifices and having pressure relief openings, a spring pressed valve in said casing for controlling said inlet and outlet orifices and normally closing said relief openings and adapted to uncover said openings when the pressure in said reheater falls below a predetermined amount.

5. In a device for the injection of water at high pressures into gas reheaters of torpedo engines, the combination of a reheater, a pump having a delivery conduit connected to said reheater, a regulating valve associated with said conduit and responsive to reheater pressures for governing the flow of fluid to said reheater, an intake conduit for said pump having a foot valve adapted to open in the bottom of the torpedo hull, and a combined priming and air exhausting conduit opening in the top of said torpedo hull and connected to said pump.

6. In a device of the character described, the combination of a reheater, a pump having conduit connections therewith for supplying fluid thereto, and means responsive to reheater pressures for governing the flow of fluid in said conduit.

7. In a device of the character described, the combination of a reheater, a pump driven by the main engine, a delivery pipe connecting said pump to said reheater, a fluid governing valve located in said delivery conduit and responsive to reheater pressures, and a plurality of inlet conduits connected to the suction chamber of said pump.

8. In a high pressure water injector device for torpedoes, a reheater, a pump having intake and delivery conduits, and a valve in the delivery conduit adapted to respond to reheater and pump delivery pressures for governing the flow of water to said reheater.

9. In an automobile torpedo, the combination of a reheater, a pump having its suction chamber provided with conduits opening in substantially opposite points of the torpedo hull and normally at different levels, and a governing valve responsive to reheater pressures for regulating the flow of water from said pump to said reheater.

In testimony whereof I have signed this specification in the presence of two subscribing witnesses.

EUGÈNE SCHNEIDER.

Witnesses:
CHAS. P. PRESSLY,
ROBERT DE SAKLINGE.